United States Patent [19]

Bar-Gadda

[11] Patent Number: 5,768,075
[45] Date of Patent: Jun. 16, 1998

[54] DISK MEDIUM W/MAGNETICALLY FILLED FEATURES ALIGNED IN ROWS AND COLUMNS

[75] Inventor: Ronny Bar-Gadda, Palo Alto, Calif.

[73] Assignee: Baradun R&D Ltd., Los Gatos, Calif.

[21] Appl. No.: 159,552

[22] Filed: Dec. 1, 1993

Related U.S. Application Data

[63] Continuation-in-part of Ser. No. 808,867, Dec. 17, 1991, Pat. No. 5,576,918.

[51] Int. Cl.$^6$ .................................................. G11B 5/82
[52] U.S. Cl. ................................. 360/135; 428/694 SG
[58] Field of Search .............................. 360/135, 97.01; 428/694 T, 694 TR, 694 SG

[56] References Cited

U.S. PATENT DOCUMENTS

| | | | |
|---|---|---|---|
| 4,326,229 | 4/1982 | Yanagisawa | 360/135 |
| 4,393,110 | 7/1983 | Fukuda | 428/173 |
| 4,544,443 | 10/1985 | Ohta et al. | 156/643 |
| 4,597,826 | 7/1986 | Majima et al. | 156/643 |
| 4,689,260 | 8/1987 | Briska et al. | 428/161 |
| 4,725,470 | 2/1988 | Katsuki | 428/64 |
| 4,734,810 | 3/1988 | Nakayama et al. | 360/135 |
| 4,738,885 | 4/1988 | Matsumoto | 428/64 |
| 4,803,106 | 2/1989 | Lenhart et al. | 428/64 |
| 4,803,577 | 2/1989 | Ezaki et al. | 360/102 |
| 4,805,055 | 2/1989 | Wright | 360/106 |
| 4,807,204 | 2/1989 | Mizutani et al. | 360/114 |
| 4,808,455 | 2/1989 | Wada et al. | 428/64 |
| 4,816,933 | 3/1989 | Izumi et al. | 360/55 |
| 4,870,524 | 9/1989 | Coe | 360/135 |
| 4,893,299 | 1/1990 | Humberstone et al. | 369/275 |
| 4,931,338 | 6/1990 | Toffle | 428/65 |
| 4,935,278 | 6/1990 | Kroubi et al. | 428/64 |
| 4,935,835 | 6/1990 | Godwin et al. | 360/135 |
| 4,939,614 | 7/1990 | Shirakura et al. | 360/135 |
| 4,943,957 | 7/1990 | Sato et al. | 428/694 |
| 4,967,184 | 10/1990 | Regelsberger | 340/572 |
| 4,976,989 | 12/1990 | Aonuma et al. | 427/48 |
| 4,977,472 | 12/1990 | Volz et al. | 360/78.14 |
| 4,985,306 | 1/1991 | Morizane et al. | 428/410 |
| 4,985,885 | 1/1991 | Ohta et al. | 369/275.1 |
| 5,008,176 | 4/1991 | Kondo et al. | 430/272 |
| 5,047,274 | 9/1991 | Tsuya et al. | 428/64 |
| 5,062,021 | 10/1991 | Ranjan et al. | 360/135 |
| 5,070,425 | 12/1991 | Inumochi | 360/135 |
| 5,093,173 | 3/1992 | Nakagawa et al. | 365/135 |
| 5,119,258 | 6/1992 | Tsai et al. | 360/135 |
| 5,166,006 | 11/1992 | Lal et al. | 360/135 |
| 5,167,096 | 12/1992 | Eltouky et al. | 51/281 SF |
| 5,191,563 | 3/1993 | Lee et al. | 369/13 |
| 5,285,343 | 2/1994 | Tanaka et al. | 360/135 |
| 5,296,989 | 3/1994 | Ochiai et al. | 360/114 |
| 5,350,618 | 9/1994 | Togawa et al. | 428/156 |
| 5,576,918 | 11/1996 | Bar-Gadda et al. | 360/135 |
| 5,626,941 | 5/1997 | Ouano | 428/141 |

FOREIGN PATENT DOCUMENTS

| | | | |
|---|---|---|---|
| 55-93423 | 2/1982 | Japan . | |
| 5720925 | 2/1982 | Japan | 360/135 |
| 2-105328 | 4/1990 | Japan . | |
| 2105328 | 4/1990 | Japan | 360/135 |
| 4-1921 | 1/1992 | Japan . | |
| 4001921 | 1/1992 | Japan | 360/135 |
| 2-144055 | 2/1992 | Japan . | |
| 4038716 | 2/1992 | Japan | 360/135 |
| 4-89616 | 3/1992 | Japan . | |
| 4089616 | 3/1992 | Japan | 360/135 |

OTHER PUBLICATIONS

J. M. Brown Low, Recording Medium, IBM Technical Disclosure Bulletin vol. 11 No. 3 Aug. 1968.

*Primary Examiner*—Stuart S. Levy
*Assistant Examiner*—David D. Davis
*Attorney, Agent, or Firm*—Burns, Doane, Swecker & Mathis, LLP

[57] ABSTRACT

A disk medium includes a substrate and a designed topography of individually magnetizable features formed on the surface of the substrate. At least a portion of the topography is formed from an etched layer of magnetizable material deposited on the surface of the substrate. An information handling system records information on the disk medium magnetically and reads the recorded information optically or magnetically.

30 Claims, 8 Drawing Sheets

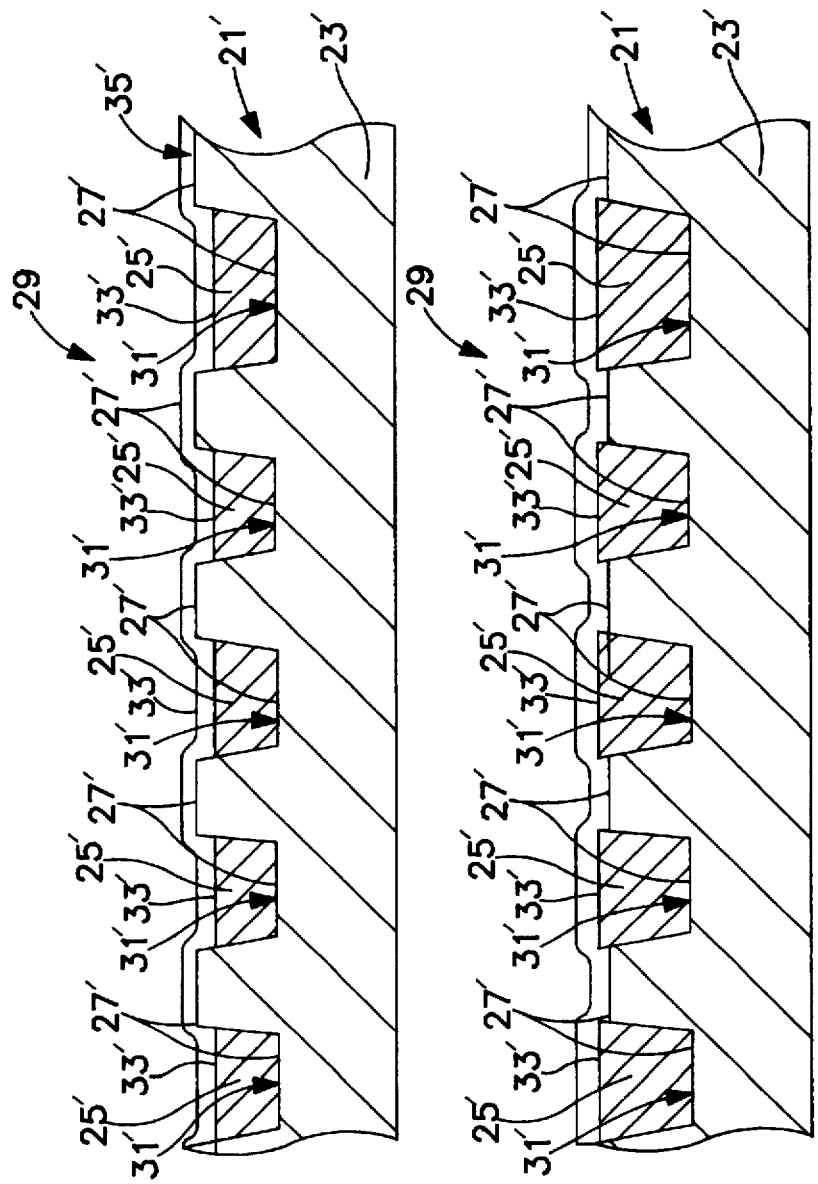

5,768,075

DISK MEDIUM W/MAGNETICALLY FILLED FEATURES ALIGNED IN ROWS AND COLUMNS

BACKGROUND OF THE INVENTION

This application is a continuation-in-part of U.S. patent application Ser. No. 07/808,867, filed Dec. 17, 1991 U.S. Pat. No. 5,576,918.

FIELD OF THE INVENTION

The present invention relates generally to disk media.

STATE OF THE ART

Magnetic disk drive assemblies as used for mass data storage in computers and electronic systems today comprise either rigid ("hard") disk drives or flexible ("floppy") drives. Both types of drives incorporate low cost data storage capacity with rapid recovery of stored data. This rapid availability of stored data is a function of the rotational speed of the disk relative to the read/write transducer as well as the proximity of the transducer to the magnetic medium. In practice, a read/write transducer is mounted in a head assembly that accurately follows the surface of a disk at flying heights of less than 1 micron. In particular, the head suspension assemblies are designed to prevent contact between the read/write head and the magnetic recording medium during operation; such contact, called head crash, can destroy a read/write head and the magnetic medium in a short time due to the friction that results from the high rotational speed of the disk relative to the head. Although current technology provides lubrication and protective layers on the disk, these measures are generally intended to compensate only for transient friction events during stop/start cycles.

In general, control of the texture characteristics of the disk surface is required to reduce the substantial attractive forces that are generated between the read/write head and the stationary disk surface. Smoother disk surface textures result in higher attractive forces that prevent proper head liftoff and flying characteristics when disk rotation is commenced. Current disk manufacturing techniques must also assure that the disk surface roughness does not exceed certain upper-bound values; if excessive surface roughness results from the texturing process, undesirable increases in flying height also limit the density with which data can be stored on the disk. A central issue in current disk texturing processes is the reliability and consistency with which the desired surface roughness is obtained. The disk surface texture is typically characterized in terms of an arithmetic average roughness value ($R_a$). Current disk texturing processes generally produce $R_a$ values in the range of 10–200 nm; the most modern disk drives achieve head flying heights of 0.2–0.3 microns with $R_a$ values of approximately 10–50 nm. These texturing processes utilize special abrasives for producing circumferential patterns of scratches on the surface of metallic (predominantly aluminum) disk substrates which inevitably create surface feature extremes in the form of peaks and valleys. U.S. Pat. Nos. 4,996,622, 4,939,614 and 4,931,338 describe variations of this general process. Several of these patents propose different textures for separate areas of the disk optimized for stop/start operations and for read/write operations. These patents document the difficulty of obtaining low flying heights (i.e., less than 0.3 microns) while simultaneously achieving acceptably low head/disk attractive forces with current disk texturing processes.

Other texturing processes combine abrasive texturing processes with chemical processes. For example, U.S. Pat. No. 4,985,306 describes a recording disk produced by subjecting a base plate containing $S_iO_2$—$Li_2O$—$Al_2O_3$ series crystallized glass to crystallizing treatment, polishing the surface of the base plate to attain a surface roughness of 15 Å to 50 Å to evenly distribute, regularly and two-dimensionally, very fine and uniform crystal grains in the amorphous layer. The base plate is then etched with an etchant having different degrees of dissolution with respect to the crystal grains and the amorphous layer to form uniform and regular convexities and concavities on the surface of the base plate. A magnetic film and a protective layer are applied over the base plate. Because the system described in this patent relies on an abrasive texturing process for distributing crystal grains, there is an inevitable randomness to the ultimate distribution of concavities and convexities.

The trend toward smaller diameter disks has also presented difficulties for prior-art manufacturing techniques. It has become progressively more difficult to achieve the required consistency in $R_a$ values and in disk flatness with decreasing disk diameter using conventional methods. Disk flatness variations cause axial runout of the read/write head during disk rotation. In current disk drives it is desirable to maintain this axial runout value at less than 1–2 microns. Conventional abrasive texturing techniques applied to current metallic disk substrates are becoming less viable as disk diameters are progressing downwards.

The trend toward smaller diameter, higher density disks has made optical information storage technology a more attractive alternative for the future. Optical disks are typically made by first coating a thin layer of photosensitive material such as a thin metal film on one side of a glass disk. A laser beam is chopped by an electro-optic modulator to which a frequency modulated digital signal corresponding to the input information, such as an analog signal, is applied. The laser beam is focused onto the disk as it is rotated and the information is recorded as a series of pits in the thin metal film.

Reading of optical disks can be accomplished in several ways. For example, in a Video High Density Disk System (VHD), reading is accomplished by an electrode on a stylus that slides along the surface of the disk. Signals recorded on the disk are picked up as capacitance variations between the disk surface and the electrode on the stylus. In other systems, however, such as Video Long Play Systems, a low-power laser beam is focused on a small read spot on the surface of the disk. Optical energy is reflected by (or transmitted through) the disk and directed to a photodetector. The energy received at the photodetector changes according to the presence or absence of pits recorded on the disk. The received energy is processed by further electronic circuitry, such as by being processed into digitized form, and then into output signals.

While optical disks offer the advantage of recording large amounts of information in a small space, optical information storage technology suffers from certain disadvantages. For example, since information is normally stored on an optical disk by the heat of a laser beam causing the thin metal film over the substrate to develop pits, optical disks suffer the disadvantage of not being inherently erasable. Further, the technique of forming pits in the thin metal film by means of a laser involves heating the film to a higher temperature to affect the grain structure of the film. Bit errors resulting from factors such as changes in ambient temperature are common and have been a primary factor in limiting commercial application of optical technology beyond fields in which bit error rate is not highly critical. Accordingly, it is desirable to provide an information storage system coupling the advantages of optical systems, such as high density recording, with an erasable medium that is not subject to error due to changes in ambient temperatures.

SUMMARY OF THE INVENTION

The present invention, generally speaking, provides a disk medium possessing the capacity to magnetically store large amounts of information. The magnetically stored information is readable, in accordance with one embodiment of the invention, by a magnetic head assembly, or, in accordance with another embodiment of the invention, by an optical head assembly.

The present invention provides a disk medium that is formed, by the processes generally associated with the shaping of layers in semiconductor chip products, to have great capacity to store information. A pattern of designed, individually magnetizable features is formed on a substrate, the features corresponding to individual bits of information. The features are physically separated from one another by non-magnetic material, thereby minimizing certain problems associated with magnetic information storage systems. Particularly, the effects of crosstalk between adjacent magnetic "bits" are minimized, such as the need to maintain head flying heights as low as possible in order to magnetically read and write on a disk on which large quantities of information can be stored is reduced and the need to use high coercivity magnetic materials for forming the magnetizable features in order to store large amounts of information on the disk is reduced.

Reading of information stored on the disk medium may be accomplished with an optical head assembly by focussing a laser beam on the disk, reflecting the beam off of or transmitting the beam through the disk and the individual features on the disk, and detecting the reflected or transmitted beam with means such as a photodetector which detects whether the individual features are magnetized or not as a function of magneto-optical effects occurring as a result of the laser beam passing through the magnetic or non-magnetic field of the individual features. Because information recording or writing on the disk medium can be performed with a magnetic head assembly and reading can be performed by an optical head assembly, the disk medium of the present invention does not suffer from disadvantages of conventional optical memory storage systems including high bit error rates due to factors such as changes in surrounding temperatures.

The present invention further provides a disk medium that, in one embodiment, contacts a magnetic head with a low coefficient of friction, provides smooth and stable travel performance in conjunction with a magnetic head for prolonged periods of time, has improved wear resistance in use and stability in storage environments, and is capable of consistent reproduction. In practice, a magnetic disk medium according to the present invention optimizes operational conditions in a system for reading information stored on the magnetic disk medium. Surface roughness characteristics of the magnetic disk medium are controlled by the processes generally associated with the shaping of layers in semiconductor chip products. These processes permit formation of disks having an average surface roughness that creates particular aerodynamic effects when the disk is rotated at particular speeds, the aerodynamic effects being useful for suspending a magnetic head at a desired flying height above the surface of the disk during read/write operations. The same processes permit control of surface characteristics relating to friction effects between the disk surface and a magnetic head during start-up and stopping of rotation of the disk. Information storage density characteristics of the magnetic disk medium may be raised to substantially whatever density is capable of being written on or read by a magnetic head of a magnetic disk assembly, the limits on the readable density being primarily those associated with conventional apparatus operational conditions, many of which, such as magnetic head flying height, are controllable through optimization of surface roughness characteristics of the magnetic disk medium of the present invention. Further, the magnetic disk medium is readable by fixed head assemblies.

The magnetic disk medium according to an embodiment of the present invention is textured without relying on known abrasive techniques. The texturing is controlled, and is therefore less susceptible to random variations of known texturing methods. There is, consequently, a consistently reproduced disk manufactured with the above method. Because the flying height of a magnetic head can be set at a known, lower height than in systems using disks manufactured by known methods, and because transient friction events can be minimized, the disk produced by a method according to the present invention is capable of storing information with a greater density than in known disks.

In accordance with one aspect of the present invention, a method for handling information is described. In the method, a designed topography is etched in a disk. Individually magnetizable features are formed on the disk, the features corresponding to the designed topography. Information is stored on the disk by selectively changing a magnetic state of individual ones of the features.

In accordance with another aspect of the invention, a disk medium an etched, designed topography in a disk, and individually magnetizable features formed on the disk and corresponding to the designed topography.

In accordance with another aspect of the invention, a memory system includes a disk medium including an etched, designed topography in a disk and individually magnetizable features formed on the disk and corresponding to the designed topography. Means are provided for magnetizing individual ones of the features and means are provided for detecting the magnetic state of the features.

In accordance with yet another aspect of the present invention, a method for making a disk medium includes the steps of etching a designed topography in a disk and forming individually magnetizable features on the disk, the features corresponding to the designed topography.

BRIEF DESCRIPTION OF THE DRAWINGS

The present invention can be further understood with reference to the following description in conjunction with the appended drawings, wherein like elements are provided with the same reference numerals. In the drawings:

FIGS. 2B–2D are cross-sectional schematic views of a disk including the portion of the disk according to FIG. 2A after filling the recesses with magnetizable material;

DETAILED DESCRIPTION OF THE PREFERRED EMBODIMENTS

Figure 1A:
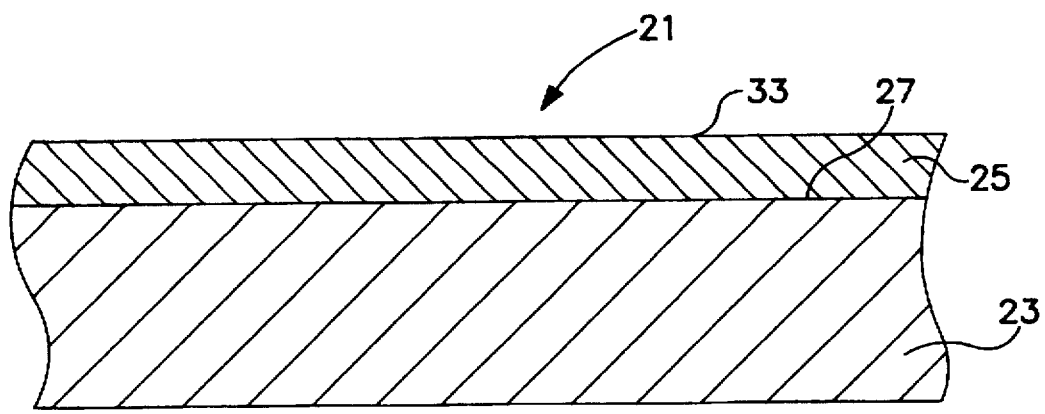
FIG. 1A is a cross-sectional schematic view of a portion of an unetched disk according to an embodiment of the present invention.

A disk medium 21 according to an embodiment of the present invention is shown in FIG. 1A. The disk medium 21 is made up of a substrate 23 which is non-magnetic and well-known and is in the form of, for example, a chemically etchable glass layer over a ceramic disk, or a polycarbonate disk, or other appropriate materials, such as glass, silicon, carbon, etc. The substrate 23 in FIG. 1A is coated with a thin layer of magnetizable material 25. The magnetizable material 25 is also well-known, and is in the form of, for example, a layer of NiCoCr, PtCoCr, Fe, or Co deposited on the surface 27 of the substrate 23 or over layer of chromium deposited on the surface of the substrate, chromium being understood to particularly facilitate increasing information storage density.

Figure 1B:
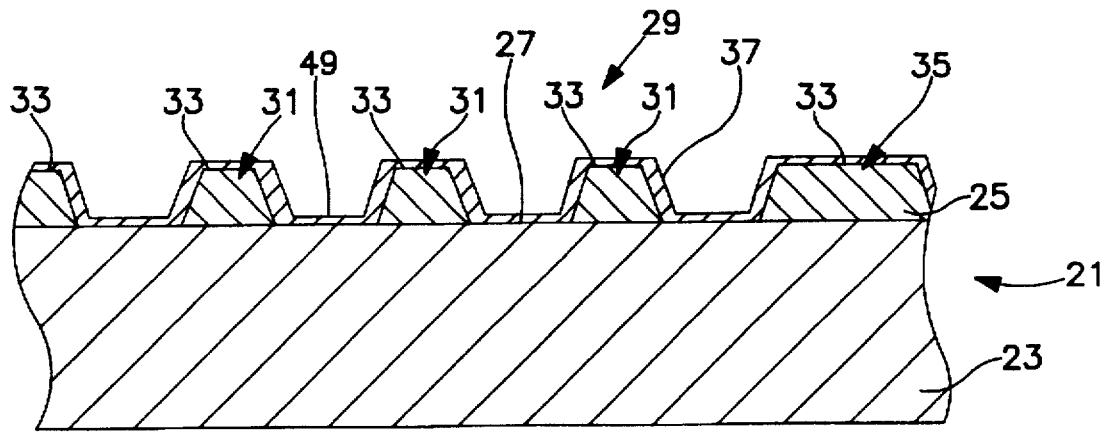
FIGS. 1B and 1C are cross-sectional schematic views of the portion of a disk according to FIG. 1A after etching.
Figure 1C:
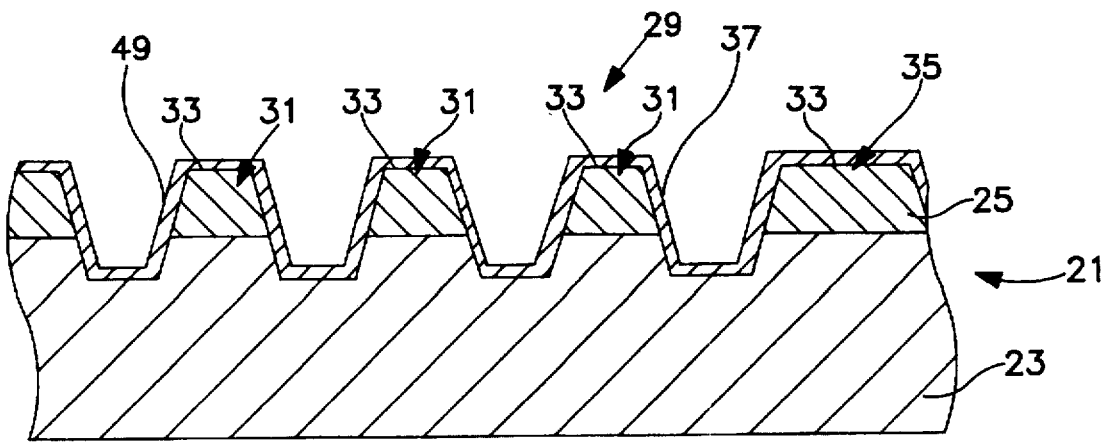

A pattern or mask for forming an etched, designed topography 29 to be etched in the magnetizable material 25 or the magnetizable material 25 and the substrate 23 is designed and generated. The pattern is transferred onto the magnetizable material 25 by known methods, such as by contact or projection methods. The pattern is developed onto the surface 33 of the magnetizable material 25. The developed pattern is then etched into the magnetizable material 25, as seen in FIG. 1B, or into the magnetizable material and the substrate 23, as seen in FIG. 1C, to form the topography 29.

Figure 3:
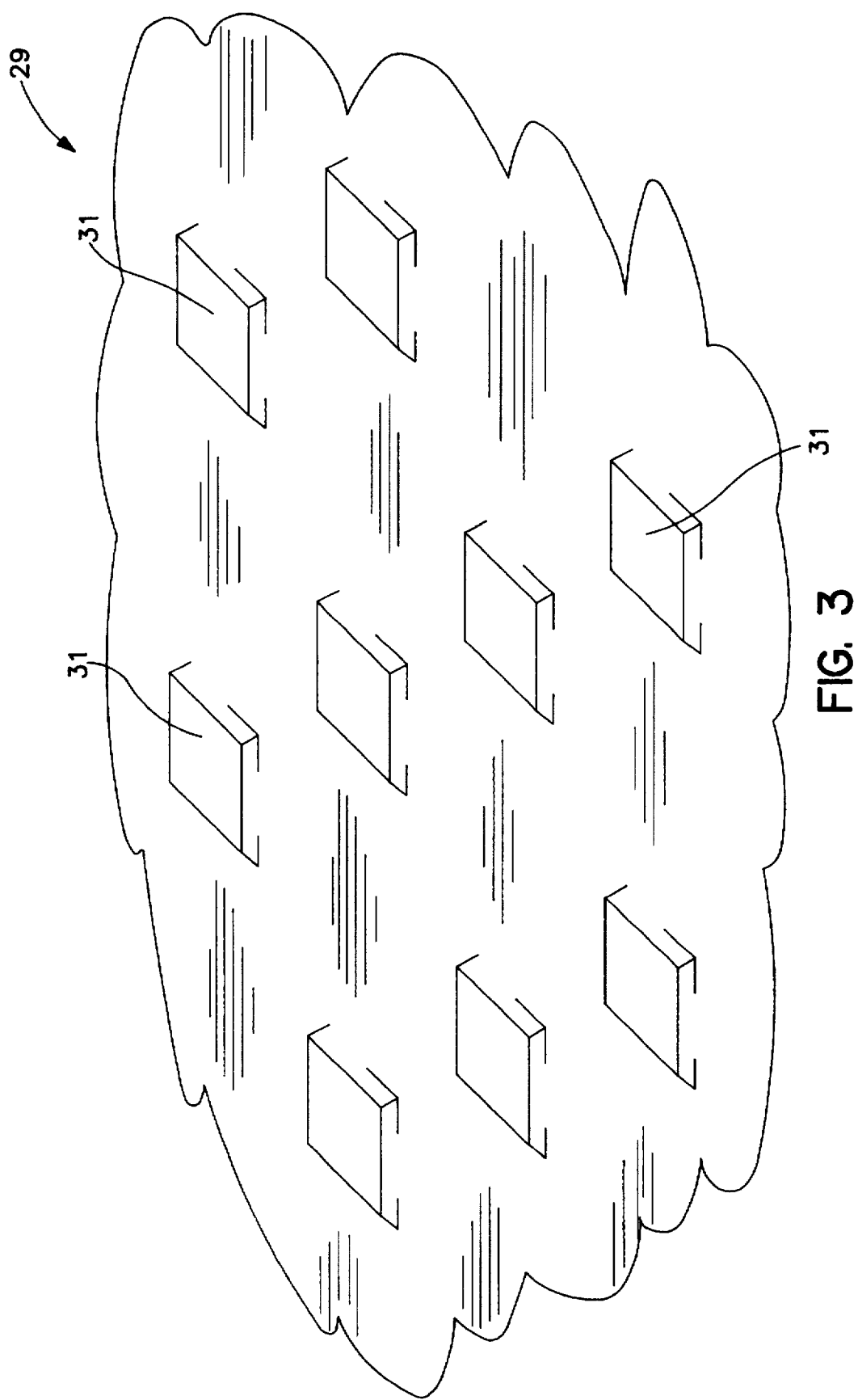
FIG. 3 is a perspective schematic view of a portion of a surface of a disk according to an embodiment of the present invention.
Figure 4A:
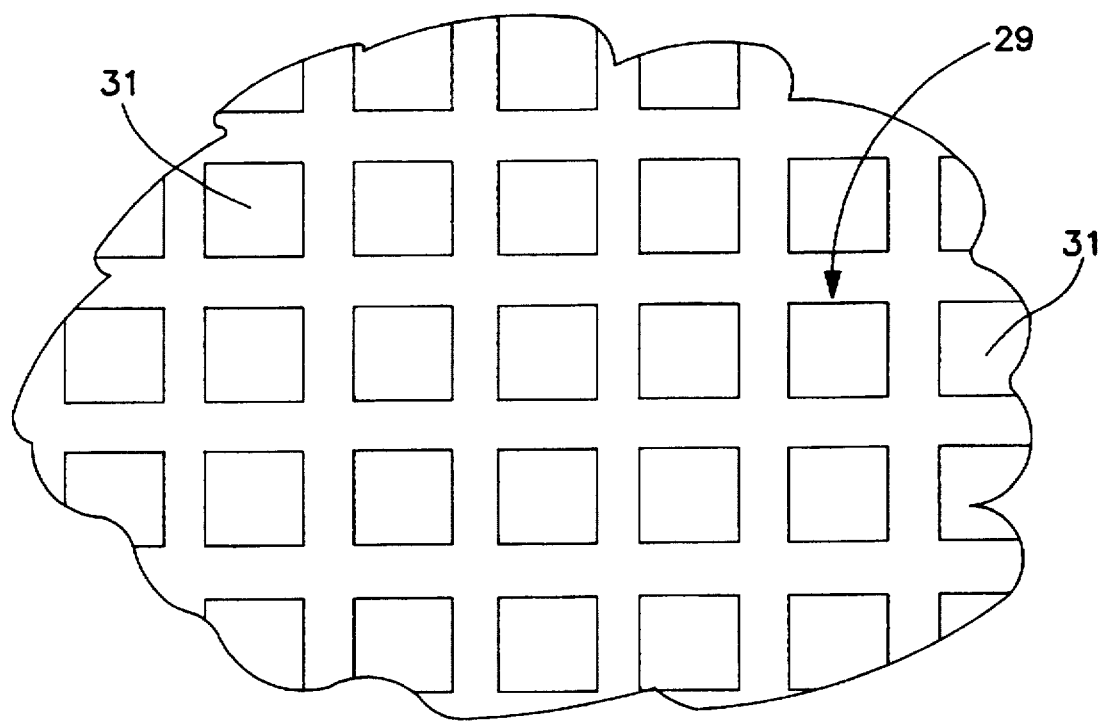
FIGS. 4A and 4B are top, plan schematic views of portions of disks according to embodiments of the present invention.
Figure 4B:
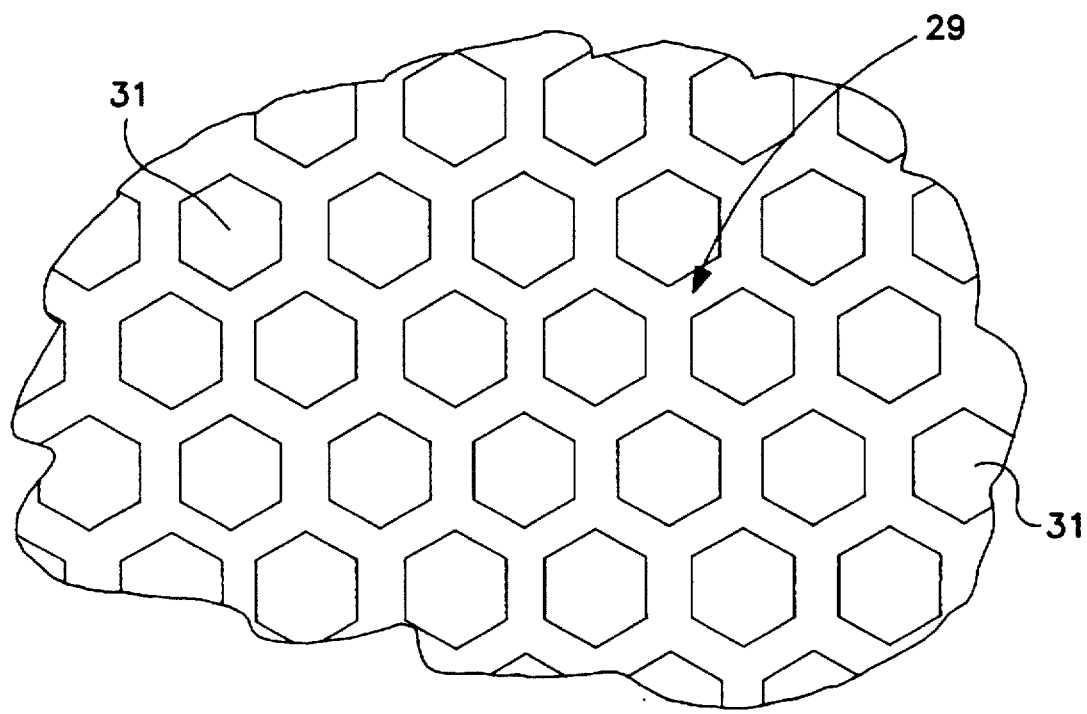

As the designed topography 29 is etched into the magnetizable material 25 (and, if desired, the substrate 23) individual magnetizable features 31 separated from one another by the non-magnetic substrate are formed. Accordingly, the features 31 correspond to the designed topography 29. The features 31 may be in any desired, preferably easily reproducible, form, such as the offset and aligned squares shown in FIGS. 3 and 4A, respectively, or the hexagons shown in FIG. 4B, or in the form of circles (not shown), etc.

The features 31 of the disk medium 21 are preferably arranged in a series of substantially circular tracks 34 (identified by dashed, annular lines on the disk 21 shown in FIG. 5) and the topography 29 preferably further includes additional, designed track identification features 35 at desired points. Annular track identification features 35 are shown in cross-section in FIGS. 1B–1C as enlarged magnetizable features, however, track identification features can be provided in any appropriate form.

After formation of the topography 29, a layer of a material such as a protective coating 37 is preferably applied over the exposed surface 27 of the substrate 23 and the exposed surfaces 33 of the features 31 formed from the magnetizable material 25. The protective coating 37 is known, and is preferably a hard protective material such as a SiN, SiC, SiO$_2$, or C material and/or a soft protective material such as a chlorofluorocarbon (CFC) material.

Figure 2A:
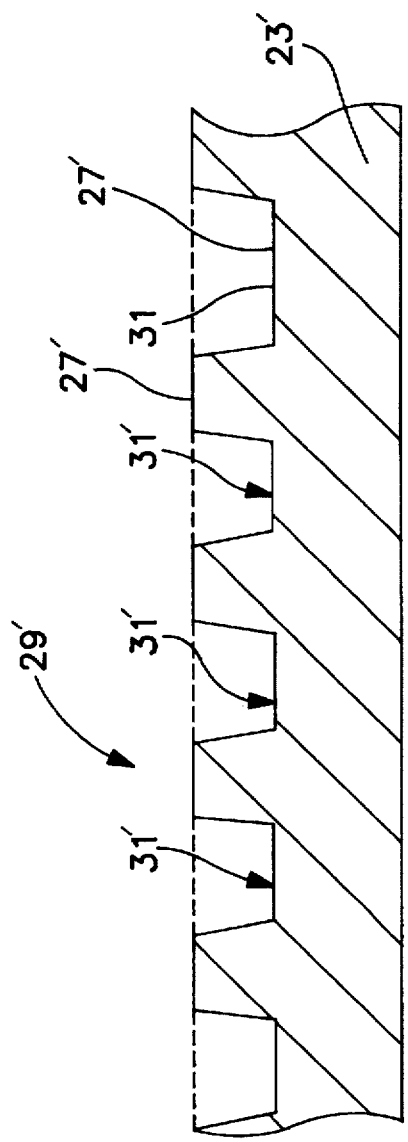
FIG. 2A is a cross-sectional schematic view of a portion of a disk etched to form a topography including recesses in a substrate according to an embodiment of the present invention.
Figure 2B:
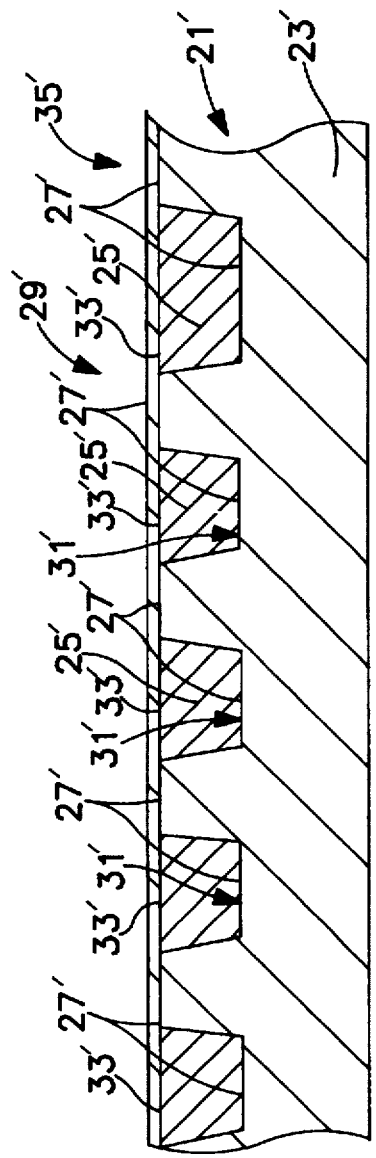

FIG. 2A shows another embodiment of a substrate 23' similar to the substrate 23 of the disk medium 21 and FIGS. 2B–2D show another embodiment of a disk medium 21' including the substrate 23'. A pattern or mask for forming an etched, designed topography 29' to be etched on the surface 27' of the substrate 23' is designed and generated. The pattern is transferred onto the substrate 23' by known methods. The pattern is developed onto the surface 27' of the substrate 23'. The pattern is then etched into the substrate 23', as seen in FIG. 2A, to form a topography 29' including recesses in the surface 27' of the substrate.

Magnetizable material 25' is deposited on the surface 27' of the substrate 23' to fill (FIG. 2B), partially fill (FIG. 2C), or over-fill (FIG. 2D) the recesses with magnetizable material and form individually magnetizable features 31' corresponding to the designed topography 29'. For example, the features 31' may be formed by depositing magnetizable material over the entire surface 27' of the substrate 23' and separating the features from other ones of the features by chemically etching away any magnetizable material that is deposited on the non-recessed portions of the surface 27' of the substrate. If necessary, the deposited magnetizable material 25' for forming the recessed features 31' is masked prior to etching. The features 31' are also preferably in easily reproducible forms, such as circles, squares, hexagons, etc.

The features 31' of the disk medium 21' are also preferably arranged in a series of tracks and the topography 29' preferably further includes track identification features 35' at desired points. After formation of the topography 29', a protective coating 37' is preferably applied over the exposed surface 27' of the substrate 23' and the exposed surfaces 33' of the features 31'.

Figure 5:
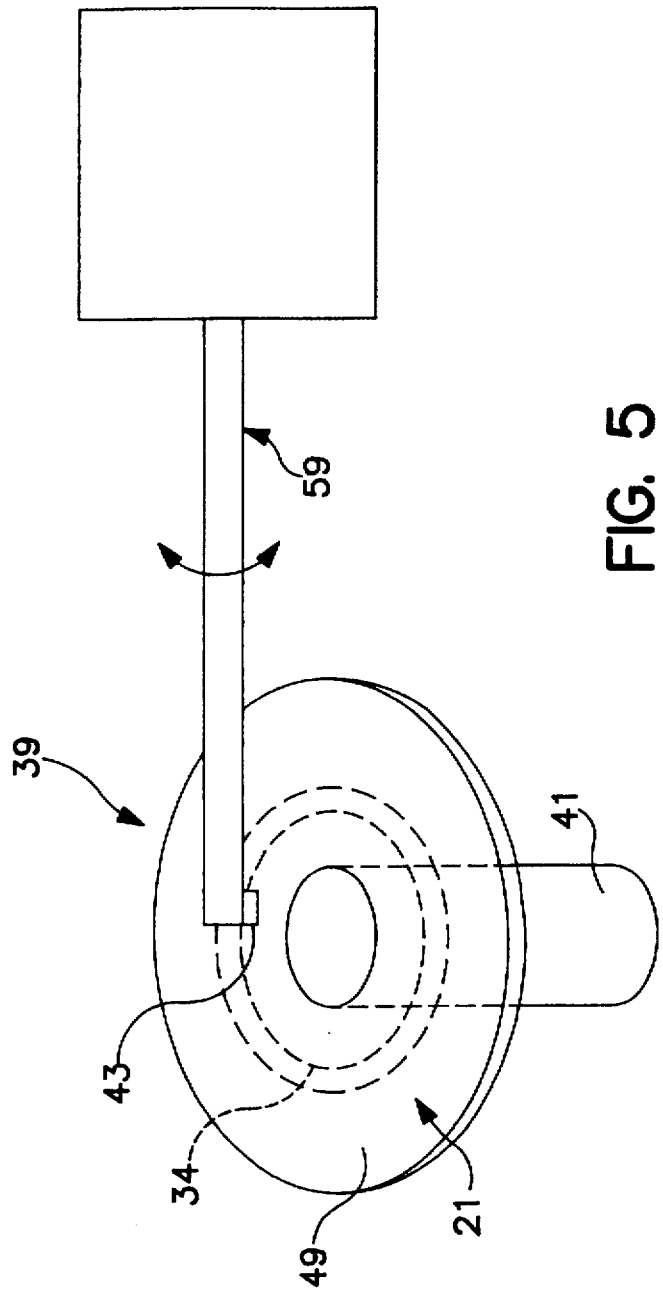
FIG. 5 is a schematic view of an information recording system and magnetic reading assembly including a suspended head for recording and reading information on a disk according to an embodiment of the present invention.

Information recording systems 39 and 39' for use in conjunction with either one of the disk media 21 or 21' are shown in FIGS. 5 and 5B, respectively. The information recording systems 39 and 39' are described in conjunction with the disk medium 21 by way of example. In the system 39 shown in FIG. 5, the disk medium 21 is rotated, as in conventional disk apparatuses, by a known driver 41. Information is recorded on the disk medium 21 by a magnetic head 43 which selectively magnetizes individual ones of the features 31. Each feature 31 thereby corresponds, in effect, to an individual bit of information.

As noted above, the features 31 formed from the magnetizable material 25 are preferably physically separated from one another as a result of the etching process. The nonmagnetic material of the substrate 23 surrounds the features 31 and, because the features are discrete, unlike in conventional magnetic disks, problems associated with interfering, adjacent magnetic fields are minimized. Particularly, the discrete features 31 permit reduction of the crosstalk that occurs in conventional magnetic disks that makes low magnetic head flying heights and high coercivity thin films necessary and limits magnetic disk storage capacity.

As a consequence of the physical separation of the individual features 31 by the non-magnetic material of the substrate 23, high coercivity magnetizable material 25 is less necessary in the disk medium 21 of the present invention than in conventional disks. Further, because of less interference, the need to minimize magnetic head flying heights during read/write operations is less necessary. Nonetheless, features of the present invention such as the physical separation of the individual features and the ability to control surface roughness characteristics on the disk media of the present invention through control of the etching process facilitate increasing information storage density on the disk medium. The reduced interference facilitates the use of higher coercivity magnetizable materials and the high degree of regularity of surface features that can be achieved on the disk media of the present invention facilitates lowering head flying heights. As in conventional disks, the use of such higher coercivity materials and/or lower head flying heights facilitates increasing information storage density.

Figure 6A:
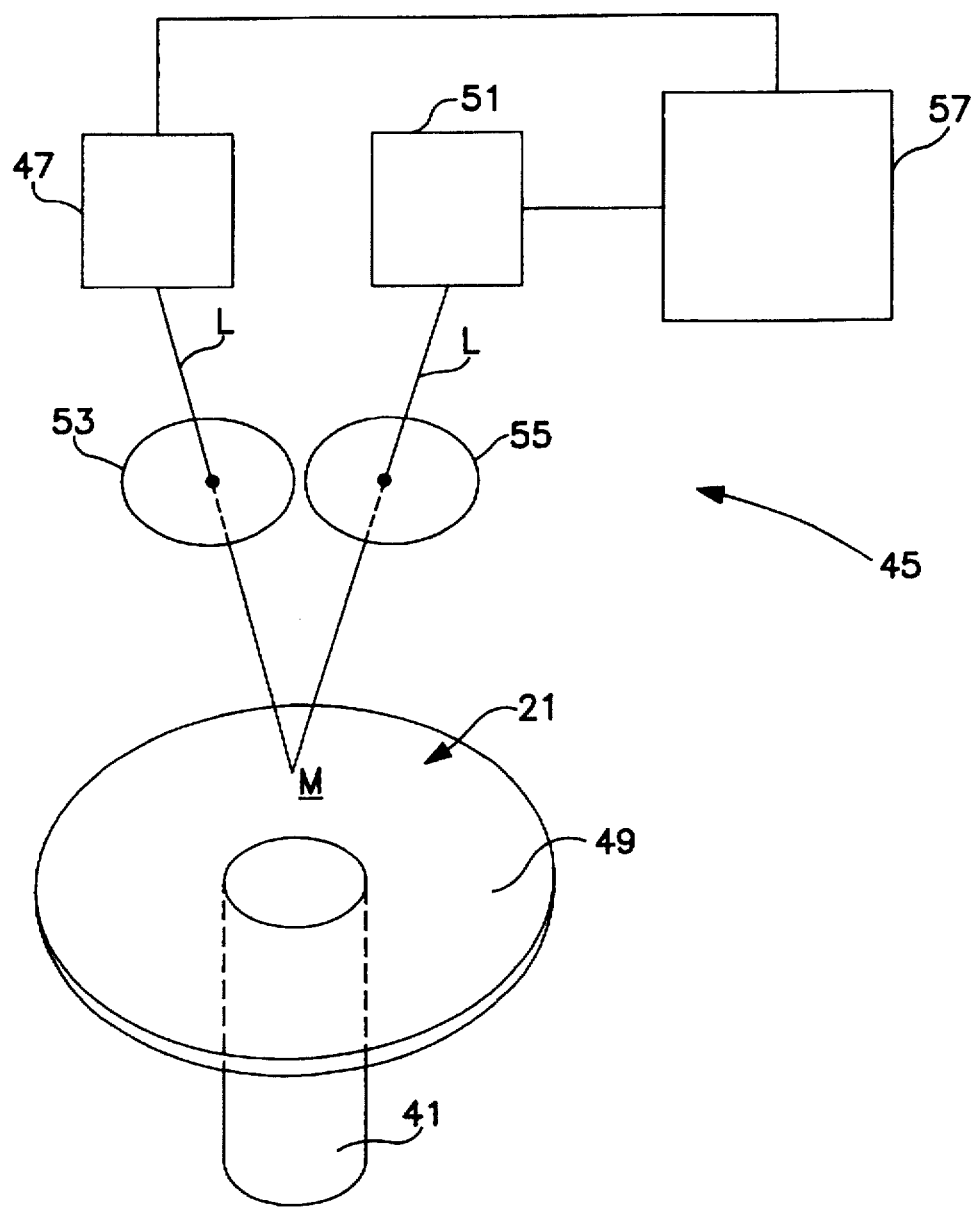
FIGS. 6A and 6B are schematic views of optical reading assemblies for reading a disk according to embodiments of the present invention.
Figure 6B:
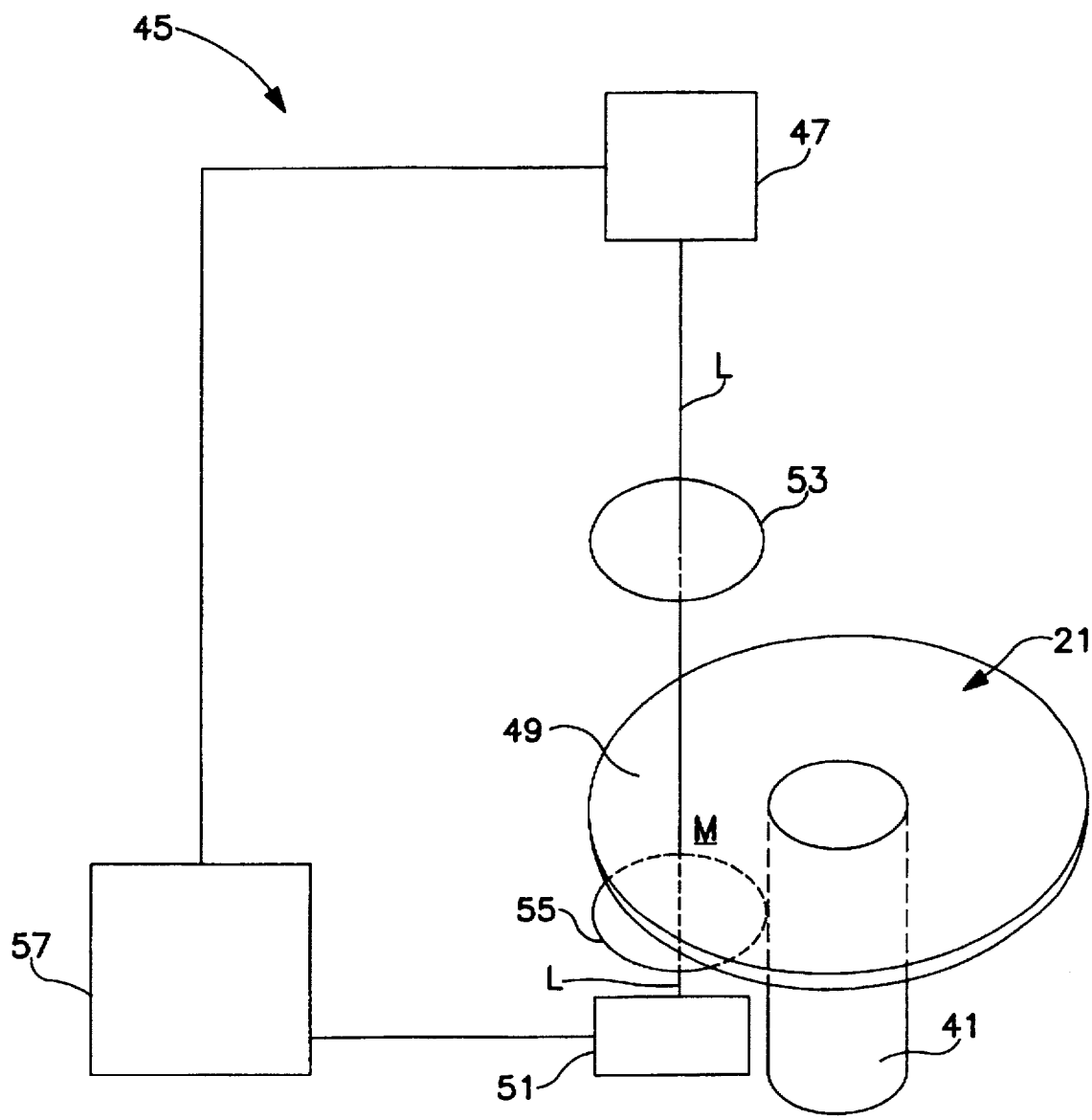

The information stored on the disk media 21 or 21' in the manner described above is preferably readable by an optical read system 45 such as is shown in FIG. 6A. In the optical read system 45, which is preferably provided in a single apparatus with the information recording system 39 or 39', the disk medium 21 is rotated by the driver 41. The optical read system 45 further includes a known laser beam generating assembly 47 for focusing a laser beam L on a read spot on the surface 49 of the disk medium 21. The laser beam L is reflected off of the surface 49 of the disk medium 21 and directed to a photodetector 51. Alternatively, as shown in FIG. 6B, the laser beam L may be transmitted through the disk medium 21 and directed to the photodetector 51.

Using the embodiment depicted in FIG. 6A for discussion purposes, when the laser beam L passes through the magnetic field M of the features on the disk medium 21 that have been magnetized, magneto-optic effects alter the polarization angle of the laser beam. For example, the Faraday effect, whereby the plane of polarization of light is rotated when light traverses a substance in a magnetic field, can be used to detect the presence or absence of magnetization of each of the features by the photodetector 51 as a result of the altered or unaltered polarization angle of the laser beam L. For example, if a polaroid 53 is provided in the path of the laser beam L prior to its incidence on the disk medium 21 and the laser beam is plane polarized in one plane, and a second polaroid 55 is provided in the path of the laser beam between the disk medium and the photodetector 51 so that the laser beam transmits through the second polaroid only in its unaltered (or, alternatively, only in its altered) state, the photodetector will detect the absence (or presence) of magnetization of a feature.

When a feature is magnetized, the plane of polarization of the laser beam L is rotated, the plane polarized laser beam is not transmitted through the second polaroid 55, and the laser beam is not detected by the photodetector. Electronic circuitry 57 is provided to process the information read in the form of detected and undetected laser beams. As noted above, the preferred example of an optical read system just discussed uses the Faraday magneto-optic effect to read information stored on the disk medium 21. One of ordinary skill in the art will appreciate that other magneto-optic effects, such as the Kerr and Pockels effects, can be used in an analogous manner to detect whether a feature is magnetized or not.

With reference to FIG. 5, the magnetic head 43 of the information recording system 39 may also be used to read recorded information on the disk medium 21 in a conventional manner. As noted above, because the features 31 of the topography 29 are preferably surrounded by the nonmagnetic material of the substrate 23, problems associated with crosstalk in magnetic information read/write systems are minimized.

In a system including means, such as the driver 41, for rotating the disk medium 21 at a predetermined rotational speed and utilizing a magnetic head 43, such as the magnetic information reading system and magnetic information recording system 39 shown in FIG. 5, when rotation of the disk is stopped, the magnetic head 43 generally rests on the surface 49 of the disk medium 21. Ordinarily, the magnetic head 43 is suspended relative to the disk medium by movable suspension means 59 such as a known suspension arm.

In magnetic read/write apparatuses having movable heads, such as the magnetic head 43 suspended by the suspension arm 59 of the apparatus 39 shown in FIG. 5, it is desirable to maintain a particular magnetic head 43 flying height. The etching of the magnetic material and/or the substrate to form the etched, designed topography of the disk media 21 and 21' is preferably controlled so that the exterior surfaces of the disk media are provided with a designed $R_a$ characteristic of the designed topography. As, for example, the disk medium 21 is rotated by the driver 41, aerodynamic effects at the surface 49 of the disk medium create an air bearing characteristic of the designed $R_a$. The air bearing is preferably capable of suspending the magnetic head 43 at a characteristic flying height above the surface 49 of the disk medium. Thus, the head flying height is characteristic of the designed topography 29 and control of the etching process. A designed topography of features in a disk medium for optimizing operational characteristics such as head flying heights in a magnetic information storage system is disclosed in U.S. patent application Ser. No. 07/808,867, the disclosure of which is hereby incorporated by reference.

Further, where movable head devices, such as the magnetic head device shown in FIG. 5, contact the disk media 21 and 21' during starting and stopping of rotation of the disk media it is desirable to reduce transient friction events which tend to damage the disk media and the head devices. A coefficient of friction $C_f$ characteristic of the surface of the disk media, for example the surface 49 of the disk medium 21, in contact with the contacting head is preferably designed to minimize such transient friction events. The etching of the magnetic material and/or the substrate to form the etched, designed topography of the disk medium 21 is preferably controlled so that the exterior surface 49 of the disk medium in contact with a particular head surface has a designed $C_f$ characteristic of the designed topography. Like the disk medium 21, the disk medium 21' shown in FIGS. 2B–2D can be formed to achieve desired $R_a$ and $C_f$ values for optimizing head flying heights and controlling and minimizing adverse friction effects. The disk medium 21' particularly facilitates minimizing adverse transient friction events between the disk surface and contacting members such as a movable head because the surface of the disk medium can be made almost perfectly smooth. Known etching processes are capable of producing highly regular surfaces, and permit lowering head flying heights to levels limited substantially only by designed topographical features.

The designed $R_a$ and $C_f$ values are preferably obtained by controlling factors such as the size and frequency of recesses and protrusions etched to form the topography of the disk media. Such factors are preferably controlled by controlling the topography etching process. Accordingly, the features 31 on the disk medium 21 corresponding to the topography 29, shown in the embodiments of FIGS. 1B and 1C, are formed, by etching the magnetizable material 25 and, if desired, the substrate 23, to be of a desired area, height, and frequency corresponding to designed $R_a$ and $C_f$ values. Similarly, the features 31' on the disk medium 21' corresponding to the topography 29', shown in the embodiments of FIGS. 2B–2D, are formed, by etching the substrate 23' and filling the etched recesses with magnetizable material 25', to be of a desired height or depth, and a desired area and frequency corresponding to designed $R_a$ and $C_f$ values. In both instances, optimal roughness and frictional characteristics of the disk media are preferably obtained by at least lengthening or shortening the etching process. In both instances, optimal roughness and frictional characteristics may further be obtained as a function of the amount of magnetizable material deposited on the surface of the substrate, either before etching, as in the embodiments of FIGS. 1B–1C, or after etching, as in the embodiments of FIGS. 2B–2D.

It is contemplated that, if the features 31 are sized at 1 micron and the interfeature spacing is 1 micron, a disk medium according the present invention will provide the capacity to record 600 Megabytes of information.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A high density disk magnetic storage medium, comprising:

a non-magnetic substrate having a planar surface into which an identically reproducible and predetermined designed topography of recesses is etched according to a pattern, the pattern consisting essentially of at least one of aligned rows and columns of equally spaced recesses, each recess in each of the at least one of aligned rows and columns being disposed on and symmetrical about a substantially straight line segment, each line segment corresponding to a respective one of the at least one of aligned rows and columns such that there are a plurality of line segments, each line segment of the plurality of line segments being parallel to each other line segment of the plurality of line segments; and discrete, individually magnetizable features following each other and equally spaced apart such that each of the features stores only a single machine-readable bit of information and such that a group of successive aligned features represents a set of ordered data, each of the features being formed by providing magnetizable material in the recesses so that each of the features is unconnected to any other one of the features by magnetizable material in a direction of reading and writing of the features, each of the features having a single continuous border, each of the single borders being constructed such that each of the single borders bounds only one of the features.

2. The disk medium of claim 1, wherein the at least one of the ordered rows and columns of spaced recesses includes at least one of offset rows and columns of spaced recesses.

3. A memory system, comprising:

a high density disk magnetic storage medium including a non-magnetic substrate into which an identically reproducible and predetermined designed topography of recesses is etched according to a pattern, the pattern consisting essentially of at least one of aligned rows and columns of equally spaced recesses, each recess in each of the at least one of aligned rows and columns being disposed on and symmetrical about a substantially segment, each line segment corresponding to a respective one of the at least one of aligned rows and columns such that there are a plurality of line segments, each line segment of the plurality of line segments being parallel to each other line segment of the plurality of line segments, and discrete individually magnetizable features following each other and equally spaced apart such that each of the features stores only a single bit of machine-readable information and such that a group of successive aligned features represents a set of ordered data, each of the features being formed by providing magnetizable material in the recesses so that each of the features is unconnected to any other one of the features by magnetizable material in a direction of reading and writing of the features, each of the features having a single continuous border, each of the single borders being constructed such that each of the single borders bounds only one of the features;

means for magnetizing individual ones of the features so that the features have a magnetic state, the magnetic state being one of magnetized and non-magnetized; and means for detecting the magnetic state of the individual ones of the features.

4. The memory system of claim 3, wherein the at least one of the ordered rows and columns of spaced recesses includes at least one of offset rows and columns of spaced recesses.

5. A disk medium, comprising:

a non-magnetic substrate having a surface; and discrete, individually magnetizable features following each other and equally spaced apart such that each of the features stores only a single bit of machine readable information and such that a group of successive aligned features represents a set of ordered data, each of the features being formed on the surface of the substrate by etching an identically reproducible and predetermined designed topography into a magnetizable material layer on the surface according to a pattern, the pattern consisting essentially of at least one of aligned rows and columns of equally spaced features, each feature in each of the at least one of aligned rows and columns being disposed on and symmetrical about a substantially straight linesegment, each line segment corresponding to a respective one of the at least one of aligned rows and columns such that there are a plurality of line segments, each line segment of the plurality of line segments being parallel to each other line segment of the plurality of line segments, the topography being etched so that each of the features is unconnected to any other one of the features by magnetizable material in a direction of reading and writing of the features, the features defining a non-planar surface of the disk medium, each of the features having a single continuous border, each of the single borders being constructed such that each of the single borders bounds only one of the features.

6. The disk medium as set forth in either claim 1 or 5, wherein the features reflect light.

7. The disk medium as set forth in either claim 1 or 5, wherein the features are light transmissive.

8. The disk medium as set forth in either claim 1 or 5, wherein the substrate includes at least one material selected from the group consisting of ceramic, polycarbonate, silicon, glass, and carbon materials.

9. The disk medium as set forth in either claim 1 or 5, wherein the magnetizable material includes a layer of chromium and a layer of material selected from the group consisting of NiCoCr, PtCoCr, Fe, and Co deposited over the layer of chromium.

10. The disk medium as set forth in either claim 1 or 5, wherein the magnetizable material includes a layer of material selected from the group consisting of NiCoCr, PtCoCr, Fe, and Co.

11. The disk medium as set forth in either claim 1 or 5, further comprising means for facilitating data retrieval.

12. The disk medium as set forth in claim 11, wherein the data retrieval facilitating means includes additional designed features formed on the disk medium.

13. The disk medium as set forth in claim 12, wherein the additional designed features include track identification features.

14. The disk medium as set forth in either claim 1 or 5, further comprising an exterior disk surface having a designed $R_a$.

15. The disk medium as set forth in claim 14, wherein the designed $R_a$ is characteristic of the designed topography.

16. The disk medium of claim 5, wherein the at least one of the ordered rows and columns of spaced features includes at least one of offset rows and columns of spaced features.

17. A memory system, comprising:

a high density disk magnetic storage medium including a non-magnetic substrate having a surface, and discrete, individually magnetizable features following each other and equally spaced apart such that each of the features stores only a single bit of machine readable information and such that a group of successive aligned features represents a set of ordered data, each of the features being formed on the surface of the substrate by etching an identically reproducible and predetermined designed topography into a magnetizable material layer on the surface according to a pattern, the pattern consisting essentially of at least one of aligned rows and columns of equally spaced features, each feature in each of the at least one of aligned rows and columns being disposed on and substantially symmetrical about a substantially straight linesegment, each line segment corresponding to a respective one of the at least one of aligned rows and columns such that there are a plurality of line segments, each line segment of the plurality of line segments being parallel to each other line segment of the plurality of line segments, the topography being etched so that each of the features is unconnected to any other one of the features by magnetizable material in a direction of reading and writing of the features, the features defining a non-planar surface of the disk medium, each of the features having a single continuous border, each of the single borders being constructed such that each of the single borders bounds only one of the features;

means for magnetizing individual ones of the features so that the features have a magnetic state, the magnetic state being one of magnetized and non-magnetized; and means for detecting the magnetic state of the individual ones of the features.

18. The memory system as set forth in either claim 3 or 17, wherein the magnetizing means includes a magnetic head assembly.

19. The memory system as set forth in either claim 3 or 17, wherein the detecting means includes a magnetic head assembly.

20. The memory system as set forth in either claim 3 or 17, wherein the detecting means includes an optical head assembly.

21. The memory system as set forth in claim 20, wherein the optical head assembly includes means for determining effects of the features on a beam of light.

22. The memory system as set forth in claim 21, wherein the effects determining means determine effects of the features on polarity of the beam of light.

23. The memory system as set forth in either claim 3 or 17, further comprising means for rotating the disk medium.

24. The memory system as set forth in claim 23, wherein the disk medium has an exterior disk surface having a designed $R_a$.

25. The memory system as set forth in claim 24, wherein the designed $R_a$ is characteristic of the designed topography.

26. The memory system as set forth in claim 24, wherein rotation of the disk medium by the rotating means causes an air bearing to form at the exterior disk surface that is characteristic of the designed $R_a$.

27. The memory system as set forth in claim 28, wherein the air bearing suspends at least one of the magnetizing means and the detecting means at a distance above the exterior disk surface that is characteristic of the designed $R_a$.

28. The memory system as set forth in claim 23, wherein, during starting and stopping of rotation of the disk medium, an exterior disk surface of the disk medium is contacted by contacting means including at least one of the magnetizing means and the detecting means, and wherein the disk exterior surface and the contacting means have a designed $C_f$.

29. The memory system as set forth in claim 28, wherein the designed $C_f$ is characteristic of the designed topography.

30. The memory system of claim 17, wherein the at least one of the ordered rows and columns of spaced features includes at least one of offset rows and columns of spaced features.

\* \* \* \* \*

UNITED STATES PATENT AND TRADEMARK OFFICE
CERTIFICATE OF CORRECTION

PATENT NO. : 5,768,075
DATED : June 16, 1998
INVENTOR(S) : Ronny Bar-Gadda

It is certified that error appears in the above-identified patent and that said Letters Patent is hereby corrected as shown below:

Title page, References Cited, Other Publications:

change "Brown Low" to - -Brownlow- -.

Column 6, line 34, delete "Information recording systems 39 and 39'" and insert therefor - -An information recording system 39- -;

line 35-36 delete "are shown in FIGS. 5 and 5B, respectively" and insert therefor - -is shown in FIG. 5- -;

line 37 delete "and 39' are" and insert therefor - -is- -.

Column 7, line 12, delete "or 39'".

Column 12, line 30, delete "28" and insert therefor - -26- -.

Signed and Sealed this

Eighth Day of September, 1998

Attest:

BRUCE LEHMAN

*Attesting Officer*       *Commissioner of Patents and Trademarks*